US010803412B2

(12) United States Patent
Bhattacharya et al.

(10) Patent No.: US 10,803,412 B2
(45) Date of Patent: Oct. 13, 2020

(54) SCHEDULING CROP TRANSPLANTATIONS

(71) Applicants: International Business Machines Corporation, Armonk, NY (US); Universiti Brunei Darussalam, Gadong BE (BN)

(72) Inventors: Subhrajit Bhattacharya, Bangalore (IN); Sambuddha Roy, Bangalore (IN); Yogish Sabharwal, Bangalore (IN); Jayasuriya M. R. Sarath Bandara, Kandy (LK); Vanessa Teo, Gadong BE (BN)

(73) Assignees: International Business Machines Corporation, Armonk, NY (US); Universiti Brunei Darussalam, Muara (BN)

( * ) Notice: Subject to any disclaimer, the term of this patent is extended or adjusted under 35 U.S.C. 154(b) by 1458 days.

(21) Appl. No.: 14/687,485

(22) Filed: Apr. 15, 2015

(65) Prior Publication Data
US 2016/0307135 A1  Oct. 20, 2016

(51) Int. Cl.
*G06Q 10/06* (2012.01)
*G06Q 50/02* (2012.01)

(52) U.S. Cl.
CPC ....... *G06Q 10/06314* (2013.01); *G06Q 50/02* (2013.01)

(58) Field of Classification Search
None
See application file for complete search history.

(56) References Cited

U.S. PATENT DOCUMENTS 9,519,861 B1 * 12/2016 Gates ................. G01N 15/0826
2002/0016676 A1   2/2002 Sann
(Continued)

FOREIGN PATENT DOCUMENTS

CN      1155971 A       8/1997
CN    101129123 A  *    2/2008  ............. A01G 16/00
(Continued)

OTHER PUBLICATIONS

Collin Thompson, Michigan State University Extension. Transplant production: Timing and crop types. https://www.canr.msu.edu/news/transplant_production_timing_and_crop_types. Apr. 10, 2017. (Year: 2017).*

(Continued)

*Primary Examiner* — Patricia H Munson
*Assistant Examiner* — Nancy N Prasad
(74) *Attorney, Agent, or Firm* — Ryan, Mason & Lewis, LLP

(57) ABSTRACT

Methods, systems, and computer program products for scheduling crop transplantations are provided herein. A method includes determining one or more lifecycle constraints associated with a given crop via analysis of crop data; determining one or more cultivation conditions constraints associated with cultivating the given crop via analysis of cultivation conditions data; determining one or more weather forecast constraints associated with a given geographic area via analysis of weather forecast data; and generating a transplantation schedule for the given crop in the given geographic area based on determining a fit across (i) the one or more lifecycle constraints, (ii) the one or more cultivation conditions constraints, and (iii) the one or more weather forecast constraints.

20 Claims, 7 Drawing Sheets

(56) References Cited

U.S. PATENT DOCUMENTS

2009/0234695 A1    9/2009  Kapadi et al.
2011/0054921 A1*   3/2011  Lynds .................... G06Q 50/02
                                                          705/1.1
2014/0258173 A1*   9/2014  Blanchard ............... G16Z 99/00
                                                          705/348

FOREIGN PATENT DOCUMENTS

| JP | 2012231684 | A  | 11/2012 |
| WO | 0126458    | A2 | 4/2001  |
| WO | 2009024546 | A2 | 2/2009  |
| WO | 2010045307 | A2 | 4/2010  |
| WO | 2013169349 | A1 | 11/2013 |

OTHER PUBLICATIONS

Kyle. How to Start and Transplant Vegetables. https://growingspaces.com/transplanting-vegetables/. Oct. 14, 2014. (Year: 2014).*

* cited by examiner

SCHEDULING CROP TRANSPLANTATIONS

FIELD

The present application generally relates to information technology, and, more particularly, to determining optimal day(s) to sow, transplant and/or plant a crop.

BACKGROUND

Determining the day to sow, plant or transplant a crop to maximize yield (referred to herein as scheduling the transplantation date of a crop) presents multiple challenges. Existing approaches commonly include a consideration of only a single transplantation of a crop, and use a yield model of the crop while a yield model is not always available for a given crop or crop variety. Moreover, generating yield models can be time-consuming and expensive. Also, in connection with existing approaches, even when available, such yield models can over-fit the data and produce inaccuracies. For example, the models utilized by existing approaches do not incorporate an effect of disease and/or pests into the yield model, though it is known that weather conditions which may be acceptable for the crop may lead to proliferation of pests and diseases, indirectly impacting yield negatively.

SUMMARY

In one aspect of the present invention, techniques for scheduling crop transplantations are provided. An exemplary computer-implemented method can include steps of determining one or more lifecycle constraints associated with a given crop via analysis of crop data; determining one or more cultivation conditions constraints associated with cultivating the given crop via analysis of cultivation conditions data; determining one or more weather forecast constraints associated with a given geographic area via analysis of weather forecast data; and generating a transplantation schedule for the given crop in the given geographic area based on determining a fit across (i) the one or more lifecycle constraints, (ii) the one or more cultivation conditions constraints, and (iii) the one or more weather forecast constraints.

In another aspect of the invention, an exemplary computer-implemented method can include steps of determining one or more lifecycle constraints associated with each of multiple crops of a pre-determined set of crops via analysis of crop data; determining one or more cultivation conditions constraints associated with each of the multiple crops of the pre-determined set of crops via analysis of cultivation conditions data; determining one or more weather forecast constraints associated with a given geographic area via analysis of weather forecast data; and generating a transplantation schedule for each of the multiple crops of the pre-determined set of crops in the given geographic area based on determining a fit across (i) the one or more lifecycle constraints associated with each of the multiple crops, (ii) the one or more cultivation conditions constraints associated with each of the multiple crops, and (iii) the one or more weather forecast constraints, wherein said transplantation schedule comprises an ordering of the multiple crops for transplantation.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps.

Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
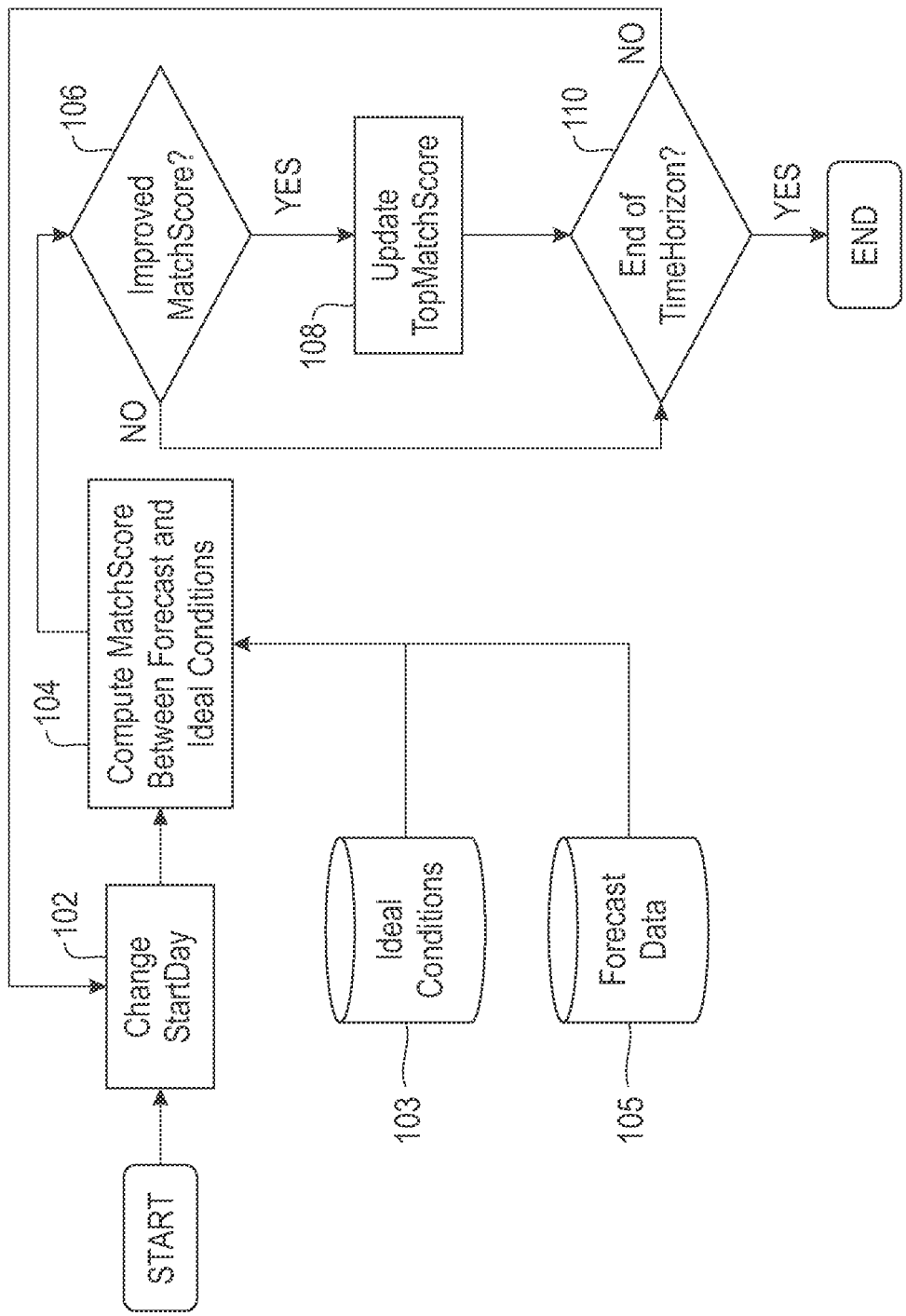
FIG. 1 is a diagram illustrating an example embodiment of the invention.

As described herein, an aspect of the present invention includes techniques for scheduling crop transplantations. At least one embodiment of the invention includes scheduling crop transplantations based on a collation of weather forecasts and ideal conditions to maximize yields of the given crop without requiring a detailed crop model. Additionally, as detailed herein, at least one embodiment of the invention includes calculating a best fit score (pertaining to a start day and fallow times) to schedule transplantations of one or more crops by computing fit scores for every start day of specified data ranges based on inputs such as ideal conditions, date ranges to carry out the transplantation, and weather forecast data. By way of example, ideal conditions can include one or more constraints such as temperature constraints, rainfall constraints, humidity constraints, etc., stage-start and stage-end offsets, and associated weights specifying relative importance, and multiple ranges with a score associated with each range.

Accordingly, at least one embodiment of the invention includes considering favorable conditions for the entire lifecycle of a given crop, from sowing to harvesting. The lifecycle of a crop can be divided into multiple stages, a feasible and an optimal range of weather and other parameters can be characterized per stage, and an optimal sowing date which optimizes the conditions over all of the stages can be determined.

By way merely of example, as temperatures increase beyond a minimum threshold, such conditions may be increasingly beneficial or profitable for a given crop, but after incorporating the consideration of another optimal threshold, the benefits of higher temperatures may reduce to a high temperature point wherein the seed of the given may not even germinate, or the given crop may wither. Accordingly, the minimum and maximum temperatures in this example define the feasible region of values, the temperature ranges wherein the growth or yield is best is the optimal region of values, and the ranges between the feasible and the optimal region can be viewed as feasible but sub-optimal regions. In addition, in accordance with one or more embodiments of the invention, feasible and optimal regions are defined by the stage of the crop cycle, as the optimal and feasible values can vary by stages.

Additionally, as detailed herein, at least one embodiment of the invention includes generating a recommendation for seeding time not only on the basis of the seeding day, but also based on suitability of the weather during the entire lifecycle of the crop. Moreover the weather parameters used in one or more embodiments of the invention are not limited to temperature, but can also include precipitation, temperature, wind speed, and any other parameters output by a weather forecasting system.

Consequently, an aspect of the invention includes maximizing the number of transplantations and/or seedings of a given crop that can be achieved in a specified time-frame while observing one or more fallowing constraints (for example, that the land has to be let fallow for a certain time between successive transplantations).

In conjunction with the description of one or more embodiments of the invention, the "yield" of a crop, as used herein, refers to the amount of the crop produced, for example, as measured in weight per unit area. Factors on which yield depends can include the genetics of the crop variety, soil conditions, water supply, weather, impact from pests and/or weeds, etc. Note also that if a crop is sown and/or transplanted on a particular date, the weather from that date until the time of harvest can have a significant effect on the yield of the crop.

Accordingly, at least one embodiment of the invention includes maximizing yield of one or more given crops by leveraging weather forecasts and one or more additional conditions which influence yield of the one or more crops (such as, for example, minimizing losses caused by pests and/or disease). By way of example, ideal conditions can be predicted for a given crop transplantation from analysis of historical data of crop yields and pest data to augment domain knowledge pertaining to ideal conditions.

An example embodiment of the invention can include obtaining input data in the form of forecasted parameter values for a given time horizon. For instance, such data might include the forecasted average temperature (or other relevant parameter) for the time horizon. Also, such an example embodiment of the invention can include obtaining additional input data in the form of the ideal conditions for a crop over the crop's entire lifecycle. The example embodiment can include subsequently performing matching, that is, determining the best offset so as to determine forecasted values which are closest to the ideal values.

In connection with multi-dimensional matching between forecasted data and ideal conditions, at least one embodiment of the invention includes determining a match between the ideal conditions and the forecasted values for a specific offset. To find the optimal transplantation date(s), a start date and an end date is provided during which the crop has to be planted. As an illustration, assume that rice is usually planted in June of every year. To determine the optimal date for planting the crop, at least one embodiment of the invention can include implementing a constraint to consider a starting date between June $1^{st}$ and June $30^{th}$. Such a constraint can be used to control other constraints a farmer may have in growing his or her crop. Given the above-noted range of starting dates, an example embodiment of the invention can include determining June $10^{th}$ to be an optimal date, while June $20^{th}$ is close to optimal. Accordingly, these dates with offsets of 10 and 20, respectively, from the start of the specified range are computed to be the most ideal to plant the crop.

Additionally, at least one embodiment of the invention includes incorporating multiple bands in addition to an ideal conditions band (that is, a band enclosing the ideal conditions, which includes an upper bound and a lower bound). To illustrate what is meant by a band, consider an example wherein a temperature of 25 degrees centigrade is best for flowering of a given crop. It may, in one or more instances, be impossible to determine a single optimal temperature. Hence, at least one embodiment of the invention includes enabling the user to specify a band of temperatures for which the crop behavior is expected to be similar.

Accordingly, in the above example, an ideal band of 24-26 degrees might be specified as an optimal temperature for the flowering stage. In an extension of the above example, assume that the feasible range for flowering is 20-30 degrees. That is, below 20 degrees and above 30 degrees, flowering will probably fail. The concept of bands can be used, for example, to penalize the weather conditions while determining the optimal conditions. As illustrated, while 24-26 degrees might be specified as optimal, 23-24 and 26-27 degrees might be two bands considered next in terms of optimality. Bands of 22-23 and 27-28 degrees might be considered third best in terms of optimality Additionally, bands of 20-22 and 28-30 degrees are feasible bands, but the worst of the feasible bands, while any temperature outside 20-30 degrees is considered unfeasible. Based on these bands, different penalties can be assigned to the predicted temperatures, with a higher penalty representing a band being further from the optimal band.

Accordingly, one or more embodiments of the invention can include dividing a parameter into bands. As noted, a penalty can be associated with a band that varies linearly with its distance from the optimal band. However, other measures of penalty can be defined, if desired.

FIG. 1 is a diagram illustrating an example embodiment of the invention. By way of illustration, step 102 includes changing and/or selecting a new start date or day. Step 104 includes computing a match score between one or more forecast conditions and one or more ideal conditions based on input from an ideal conditions database 103 and a forecast data database 105. Based on step 104, step 106 includes determining whether the computed match score is an improvement upon a previously-computed match score. If yes (that is, the match score computed in step 104 is an improvement), then step 108 includes updating the top match score. If no (that is, the match score computed in step 104 is not an improvement), then step 110 includes determining whether the end of a given time horizon has been reached. If yes (that is, the end of the time horizon has been reached), then the techniques depicted in FIG. 1 end. If no (that is, the end of the time horizon has not been reached), then the techniques depicted in FIG. 1 return back to step 102. Additionally, in at least one embodiment of the invention, the top N number of best start dates based on an N specified by the user can be stored instead of storing the best start day.

As detailed in connection with one or more embodiments of the invention, ideal conditions constraints can include lifecycle constraints, stage constraints, and multiple crop constraints. Lifecycle constraints include constraints that apply throughout the lifecycle, such as temperature, rainfall, humidity, hours of sunlight, etc. Stage constraints include constraints that only apply to certain stages (such as, for example, the ripening phase) and can include night-time temperatures, etc. Multiple crop constraints can include, for example, fallow time between transplantations.

Figure 2:
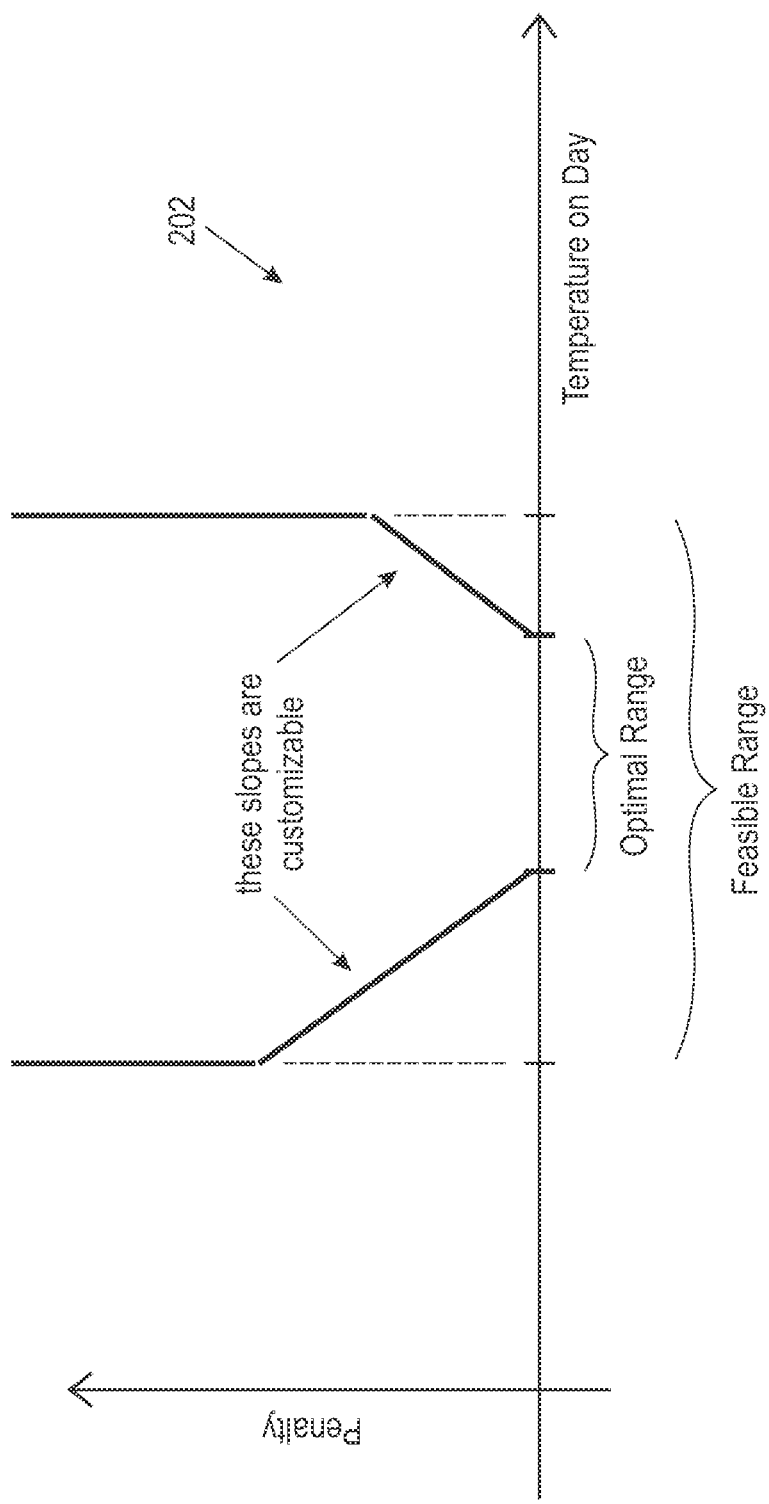
FIG. 2 is a diagram illustrating a graph depicting an aspect of an example embodiment of the invention.

FIG. 2 is a diagram illustrating a graph 202 depicting an aspect of an example embodiment of the invention. By way of illustration, graph 202 depicts a Y-axis that represents penalty values and an X-axis that represents temperature values for a given day. Additionally, example graph 202 depicts a feasible range and an optimal range within the temperature axis. As can be seen, the penalty when the temperature is in the optimal range is zero. As the temperature goes outside of the band and moves left (that is, reduces further than the minimum temperature of the optimal band), the penalty associated with the temperature increases linearly. Similarly, if the temperature is outside of the band, as the temperature increases, the penalty associated with it increases linearly. The penalty associated with a temperature outside of the optimal range is shown as linear for illustration purposes only. In one or more embodiments of the invention, such a penalty can also be non-linear.

Figure 3:
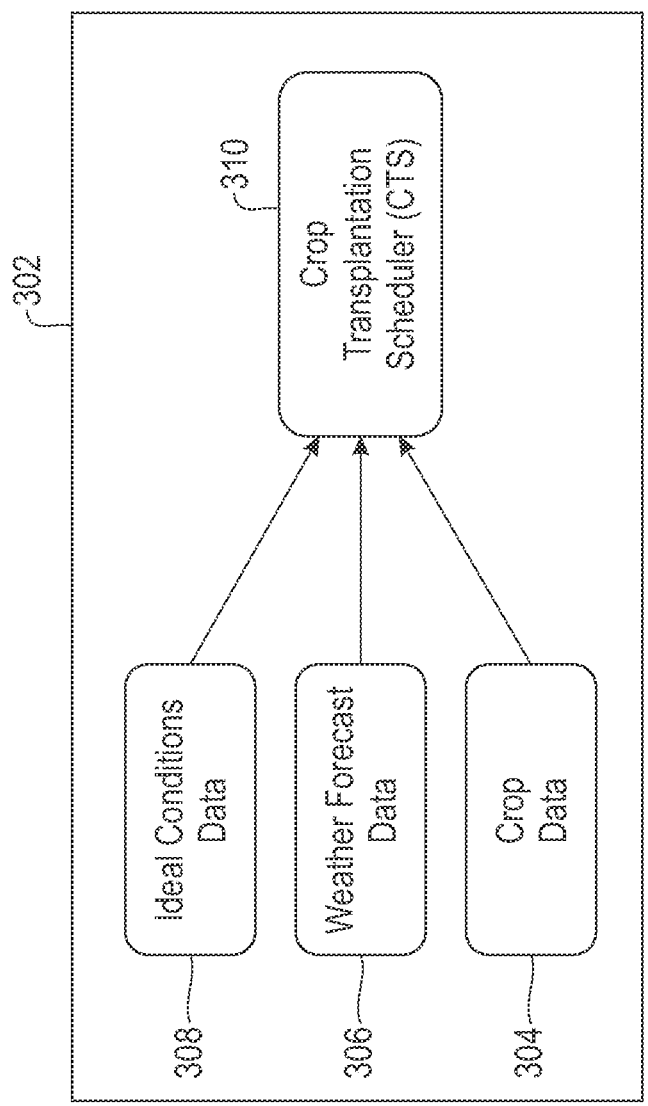
FIG. 3 is a diagram illustrating system architecture, according to an example embodiment of the invention.

FIG. 3 is a diagram illustrating system architecture, according to an example embodiment of the invention. By way of illustration, FIG. 3 depicts a system 302 that includes a crop data module 304, a weather forecast data module 306, an ideal conditions data module 308 and a crop transplantation scheduler (CTS) module 310. The crop data module 304 analyzes crop data obtained from one or more sources, such as databases that can be accessed and/or built in one or more embodiments of the invention. Crop data can include, for example, the stages of the crop, the parameters of the crop which undergo significant development in that stage, the weather parameters important to healthy growth of the crop in a given stage, etc. Additionally, the weather forecast data module 306 analyzes weather forecast data pertaining to one or more parameters obtained from one or more sources, such as databases that can be accessed and/or built in one or more embodiments of the invention. Weather parameters can include, for example, rainfall, average maximum temperature, average minimum temperature, temperatures at a certain time of the day, total hours of sunlight, average relative humidity, etc. It should also be noted that even though average or cumulative numbers are used, by reducing the duration between measurements, the averages or cumulative numbers can be computed over a day or over hours or even over tens of minutes.

Further, the ideal conditions data module 308 analyzes input data that includes ideal conditions data for the specific crop(s) being transplanted and utilizes predictions from historical data to augment the domain knowledge about such ideal conditions. Such historical data can be obtained from one or more sources, such as databases that can be accessed and/or built in one or more embodiments of the invention. Observations by farmers and/or scientists from cultivation of the crop(s) under different conditions can be encompassed by the historical data. For example, farmers and/or scientists may have observed that low temperatures during the flowering stage help certain flowers bloom. Historical data may also include, for example, data from observations that the early stages of crop growth require substantial amounts of water for a given crop. Additionally, domain knowledge parameters can include, by way of example, hours of sunlight, temperature, rainfall, and/or relative humidity.

Additionally, as depicted in FIG. 3, the crop transplantation scheduler module 310 determines and/or computes an optimized schedule for transplanting the specific crop(s) at issue based on input from the crop data module 304, the weather forecast data module 306, and the ideal conditions data module 308.

By way of illustration, consider the following example objective function carried out in accordance with one or more embodiments of the invention. The example objective function aims to maximize a total fit or match across (i) a temperature match, (ii) a rainfall match, (iii) a humidity match, and (iv) a night-time temperature match. Also, the example objective function can consider various parameters of day d, such as: $H(d)$=humidity; $S(d)$=hours of sunlight; $R(d)$=rainfall; $T(d)$=average temperature; and $NT(d)$=average night-time temperature. By way of illustration, temperature constraints can be modeled as follows.

In connection with overall temperatures, given day d of the lifecycle of the crop, let $UFT(d)$ and $LFT(d)$ denote the upper feasible temperature and lower feasible temperature, respectively, on day d. Also, given day d of the lifecycle, let $UOT(d)$ and $LOT(d)$ denote the upper optimal temperature and lower optimal temperature, respectively, on day d. Further, given day d with average temperature $T(d)$, at least one embodiment of the invention can include utilizing a weighting function $WT(d)$ depending on the selected parameters. For example, $WT(d)=f(T(d), UFT(d), LFT(d), UOT(d), LOT(d))$. If $T(d)$ does not lie in the range $[LFT(d), UFT(d)]$ (the feasible range), then $WT(d)$=infinity.

In connection with night-time temperatures, one or more embodiments of the invention can utilize a different weighting function $WNT(d)$ (that is, a different weighting function than was used above in connection with overall temperatures). For instance, in one example embodiment, $WNT(d)$ is 0 unless d is in the ripening phase of the crop. (For the ripening phase, it can be important to minimize the total night-time temperature.)

In accordance with one or more embodiments of the invention, an overall objective function can include $\min_{over\ offsets\ p} \sum_{d\ over\ lifecycle\ of\ crop} \{H(d+p)-S(d+p)+R(d+p)+WT(d)+WNT(d)\}$. Because at least one embodiment of the invention includes assigning penalties if the parameter is outside of the optimal range or band (the penalty being higher the further the parameter is from the optimal) and computing the sum of penalties, a set of days over which the penalties are minimized can be an optimal match for the given constraints or given optimal conditions.

Figure 4:
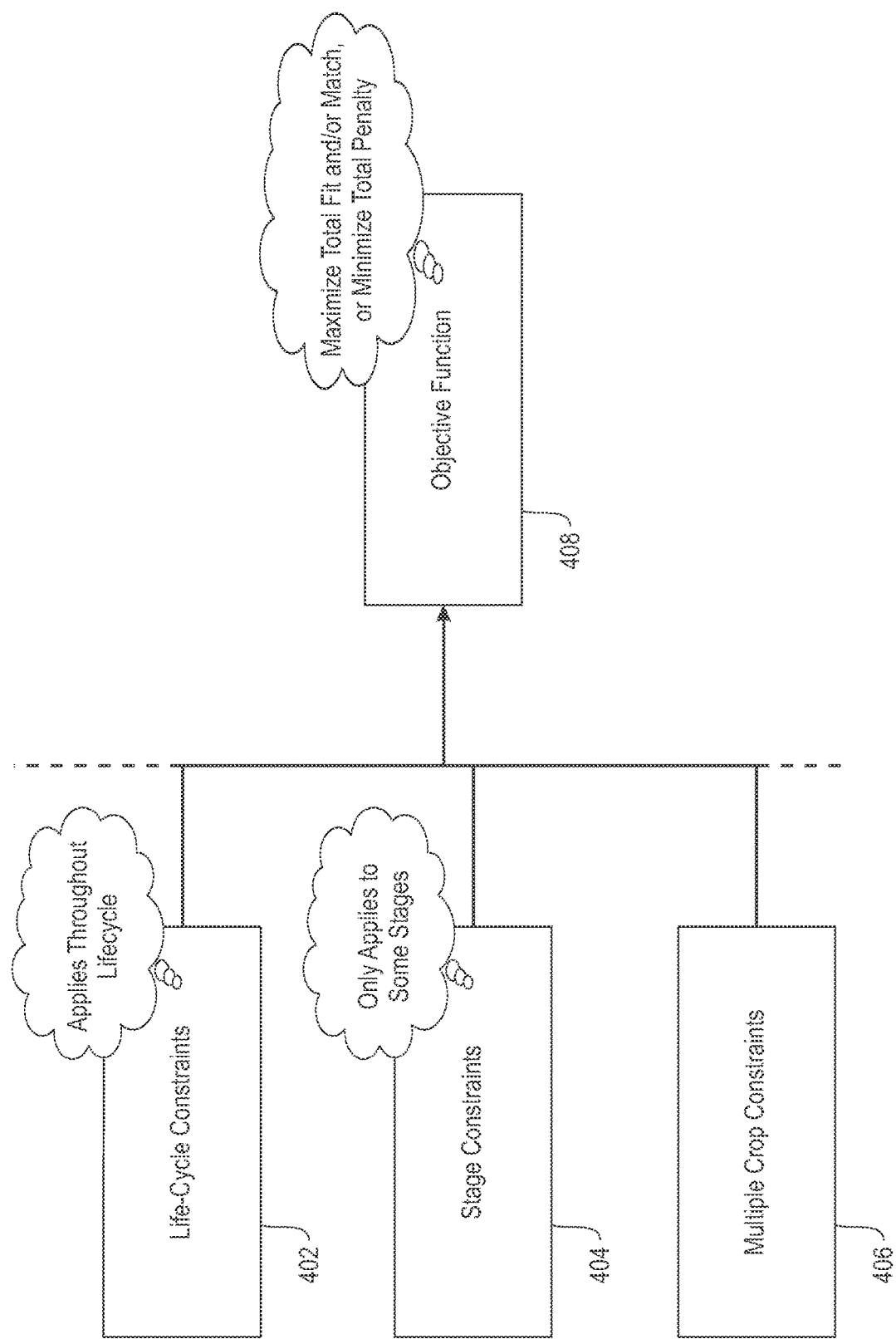
FIG. 4 is a diagram illustrating an example embodiment of the invention.

FIG. 4 is a diagram illustrating an example embodiment of the invention. By way of illustration, FIG. 4 depicts ideal condition constraint components such as a lifecycle constraints component 402, a stage constraints component 404, and a multiple crop constraints component 406. The lifecycle constraints component 402 can encompass information that applies throughout an entire crop lifecycle such as, for example, temperature data, rainfall data, humidity data, etc. The stage constraints component 404 can encompass information that applies to only certain stages of a crop such as, for example, night-time temperature data, etc. Additionally, the multiple crop constraints component 406 can encompass information such as, for example, fallow time data (between transplantations), etc.

As also depicted in FIG. 4, the lifecycle constraints component 402, the stage constraints component 404, and the multiple crop constraints component 406 provide input to an objective function component 408. The objective function, as detailed herein, includes utilizing the provided input to maximize a total fit and/or match for one or more crops, or to minimize a total penalty corresponding to one or more crops. By way of example, a "total fit" calculation can equal a temperature penalty+a rainfall penalty+a humidity penalty+a night-time temperature penalty.

Figure 5:
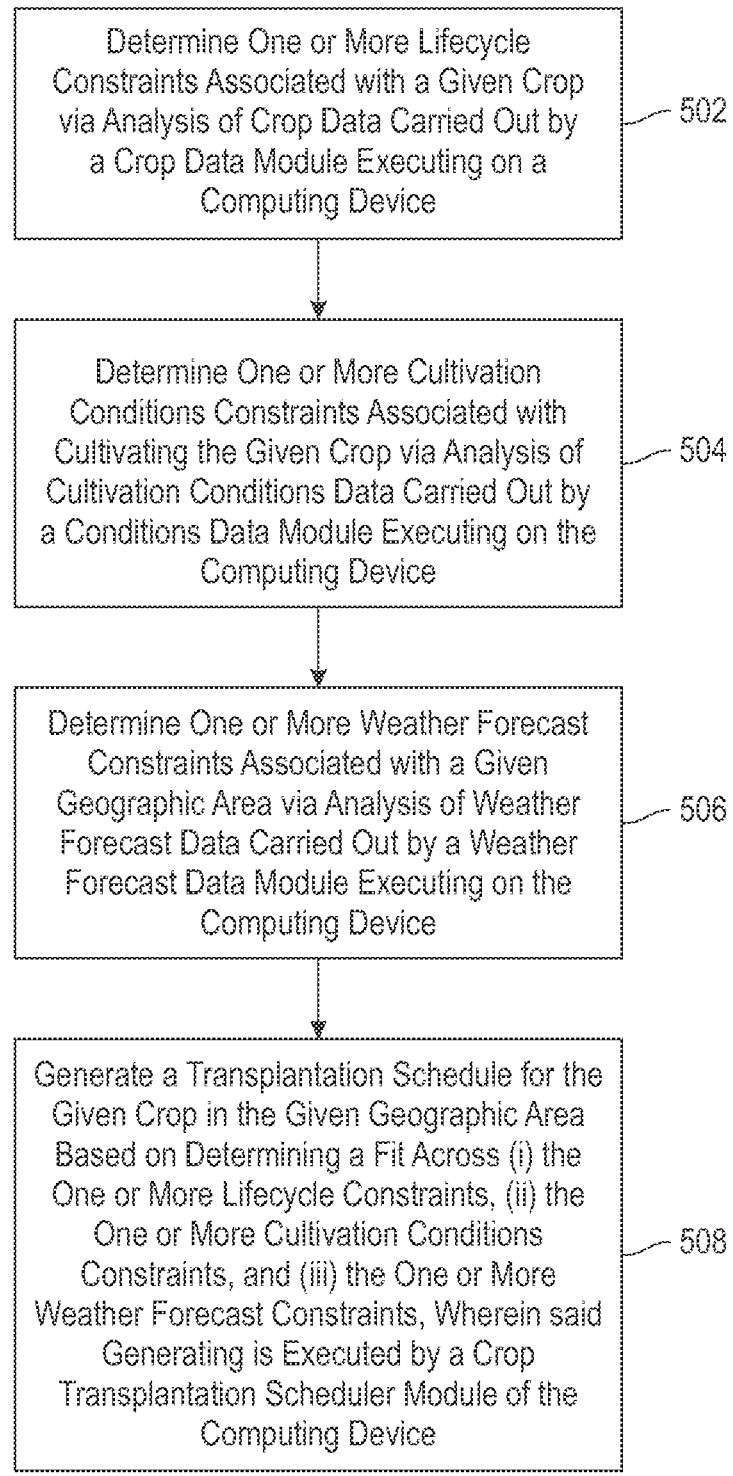
FIG. 5 is a flow diagram illustrating techniques according to an embodiment of the invention.

FIG. 5 is a flow diagram illustrating techniques according to an embodiment of the present invention. Step 502 includes determining one or more lifecycle constraints associated with a given crop via analysis of crop data carried out by a crop data module executing on a computing device. Lifecycle constraints can include (i) a start date for each of one or more stages associated with cultivation of the given crop and/or (ii) an end date for each of one or more stages associated with cultivation of the given crop. The techniques depicted in FIG. 5 can also include applying a weight to each of the one or more lifecycle constraints associated with the given crop based on relative importance of the given lifecycle constraint among the one or more lifecycle constraints.

Step 504 includes determining one or more cultivation conditions constraints associated with cultivating the given crop via analysis of cultivation conditions data carried out by a conditions data module executing on the computing device. Cultivation conditions constraints can include (i) at least one range of rainfall amount associated with growth of the given crop, (ii) at least one range of humidity associated with growth of the given crop, (iii) at least one temperature range associated with growth of the given crop, and/or (iv) at least one range of daily sunlight amount associated with growth of the given crop. Also, cultivation conditions constraints can include a date range within which a transplantation is to be carried out. Further, cultivation conditions constraints can include one or more conditions associated with impeding growth of the given crop such as, for example, one or more diseases and/or one or more pests.

The techniques depicted in FIG. 5 can also include applying a weight to each of the one or more cultivation conditions constraints associated with the given crop based on relative importance of the given cultivation conditions constraint among the one or more cultivation conditions constraints.

Step 506 includes determining one or more weather forecast constraints associated with a given geographic area via analysis of weather forecast data carried out by a weather forecast data module executing on the computing device. Weather forecast constraints can include a predication for one or more weather parameters for a given period of time. The techniques depicted in FIG. 5 can also include applying a weight to each of the one or more weather forecast constraints associated with the given geographic area based on relative importance of the given weather forecast constraint among the one or more weather forecast constraints.

Step 508 includes generating a transplantation schedule for the given crop in the given geographic area based on determining a fit across (i) the one or more lifecycle constraints, (ii) the one or more cultivation conditions constraints, and (iii) the one or more weather forecast constraints, wherein said generating is executed by a crop transplantation scheduler module of the computing device. As detailed herein, generating the transplantation schedule for the given crop can include computing a fit score for each constraint across (i) the one or more lifecycle constraints, (ii) the one or more cultivation conditions constraints, and (iii) the one or more weather forecast constraints. Additionally, for every constraint, a fit score is computed by determining the range having the highest score for which the parameter forecast lies within an ideal condition range for the specified stage dates (that is, within the start day+a stage-start offset and start day+a stage-end offset). At least one embodiment of the invention further includes aggregating a weighted fit score across all constraints to determine a fit score for a given period of time, wherein the given period of time can include a given day. Additionally, one or more embodiments of the invention include outputting the given day associated with the fit score as the start day for the transplantation schedule for the given crop.

Figure 6:
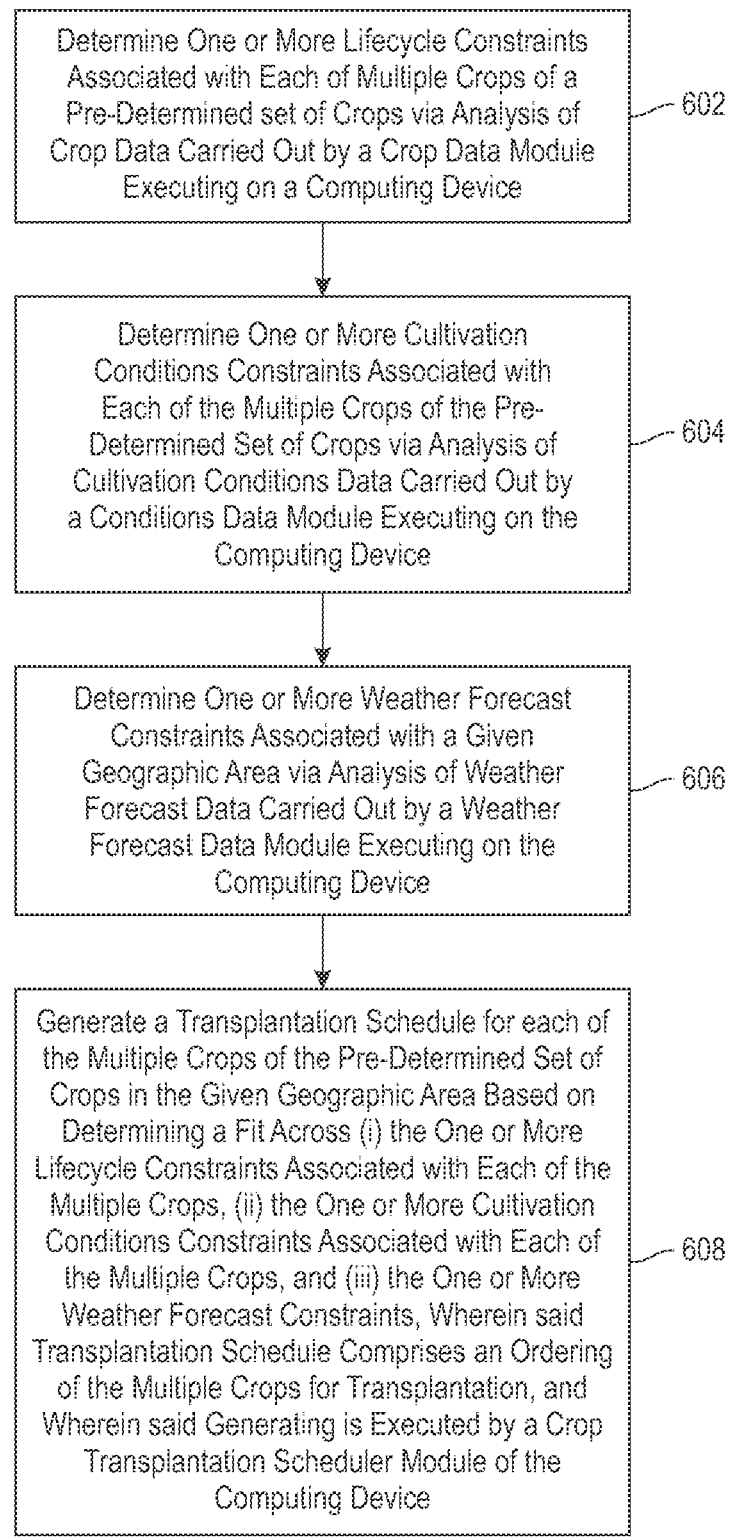
FIG. 6 is a flow diagram illustrating techniques according to an embodiment of the invention.

FIG. 6 is a flow diagram illustrating techniques according to an embodiment of the present invention. Step 602 includes determining one or more lifecycle constraints associated with each of multiple crops of a pre-determined set of crops via analysis of crop data carried out by a crop data module executing on a computing device. Step 604 includes determining one or more cultivation conditions constraints associated with each of the multiple crops of the pre-determined set of crops via analysis of cultivation conditions data carried out by a conditions data module executing on the computing device. As detailed herein, cultivation conditions constraints can include a range of time required for fallowing between successive transplantations in the given geographic area. Step 606 includes determining one or more weather forecast constraints associated with a given geographic area via analysis of weather forecast data carried out by a weather forecast data module executing on the computing device.

Step 608 includes generating a transplantation schedule for each of the multiple crops of the pre-determined set of crops in the given geographic area based on determining a fit across (i) the one or more lifecycle constraints associated with each of the multiple crops, (ii) the one or more cultivation conditions constraints associated with each of the multiple crops, and (iii) the one or more weather forecast constraints, wherein said transplantation schedule comprises an ordering of the multiple crops for transplantation, and wherein said generating is executed by a crop transplantation scheduler module of the computing device.

In accordance with one or more embodiments of the invention, generating the transplantation schedule for each of the multiple crops includes computing, for each specified potential start day for a first crop of the multiple crops, a fit score for each constraint across (i) the one or more lifecycle constraints, (ii) the one or more cultivation conditions constraints, and (iii) the one or more weather forecast constraints. Such an embodiment also includes aggregating a weighted fit score across all constraints to determine a fit score for each specified potential start day for a first crop to determine a start day for the first crop. Further, such an embodiment also includes computing, for a second crop of the multiple crops, and for each specified fallow time period subsequent to the start day for the first crop, a fit score for each constraint across (i) the one or more lifecycle constraints, (ii) the one or more cultivation conditions constraints, and (iii) the one or more weather forecast constraints. Additionally, such an embodiment includes aggregating a weighted fit score across all constraints to determine a fit score for each specified time period subsequent to the start day of the first crop to determine a start day for the second crop.

The techniques depicted in FIG. 5 and FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 and FIG. 6 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 7:
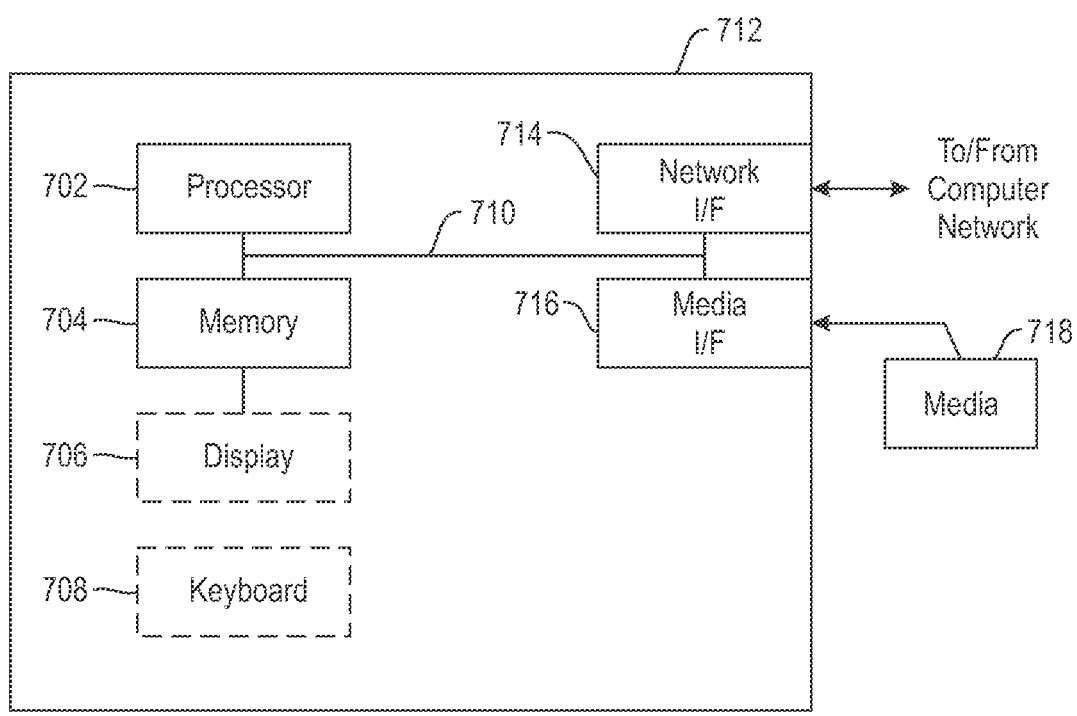
FIG. 7 is a system diagram of an exemplary computer system on which at least one embodiment of the invention can be implemented.

Additionally, an aspect of the present invention can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, generating and providing a best fit score to schedule transplantations of a crop based on constraints such as stage-start and stage-end offsets, an associated weight specifying the relative importance, and multiple ranges with a score associated with each range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    determining one or more lifecycle constraints associated with a given crop by analyzing crop data via a crop data module executing on a computing device;
    determining one or more cultivation conditions constraints associated with cultivating the given crop by analyzing cultivation conditions data via a conditions data module executing on the computing device;
    determining one or more weather forecast constraints associated with a given geographic area by analyzing weather forecast data via a weather forecast data module executing on the computing device;
    generating a transplantation schedule for increasing yield of the given crop in the given geographic area based on determining a fit across (i) the one or more lifecycle constraints, (ii) the one or more cultivation conditions constraints, and (iii) the one or more weather forecast constraints, wherein said generating is executed by a crop transplantation scheduler module of the computing device; and
    transplanting at least a portion of the given crop within the given geographic area in accordance with the transplantation schedule.

2. The method of claim 1, comprising:
    applying a weight to each of the one or more lifecycle constraints associated with the given crop based on relative importance of the given lifecycle constraint among the one or more lifecycle constraints.

3. The method of claim 1, comprising:
    applying a weight to each of the one or more cultivation conditions constraints associated with the given crop based on relative importance of a given cultivation conditions constraint among the one or more cultivation conditions constraints.

4. The method of claim 1, comprising:
    applying a weight to each of the one or more weather forecast constraints associated with the given geographic area based on relative importance of a given weather forecast constraint among the one or more weather forecast constraints.

5. The method of claim 1, wherein said one or more lifecycle constraints comprise (i) a start date for each of one or more stages associated with cultivation of the given crop and/or (ii) an end date for each of the one or more stages associated with cultivation of the given crop.

6. The method of claim 1, wherein said one or more cultivation conditions constraints comprise (i) at least one range of rainfall amount associated with growth of the given crop, (ii) at least one range of humidity associated with growth of the given crop, (iii) at least one temperature range associated with growth of the given crop, and/or (iv) at least one range of daily sunlight amount associated with growth of the given crop.

7. The method of claim 1, wherein said one or more cultivation conditions constraints comprises a date range within which a transplantation is to be carried out.

8. The method of claim 1, wherein said one or more cultivation conditions constraints comprise one or more conditions associated with impeding growth of the given crop.

9. The method of claim 8, wherein said one or more conditions associated with impeding growth of the given crop comprise one or more diseases and/or one or more pests.

10. The method of claim 1, wherein said one or more weather forecast constraints comprises a predication for one or more weather parameters for a given period of time.

11. The method of claim 1, wherein said generating the transplantation schedule for the given crop comprises computing a fit score for each constraint across (i) the one or more lifecycle constraints, (ii) the one or more cultivation conditions constraints, and (iii) the one or more weather forecast constraints.

12. The method of claim 11, comprising:
    aggregating a weighted fit score across all constraints to determine a fit score for a given period of time.

13. The method of claim 12, wherein the given period of time comprises a given day.

14. The method of claim 13, comprising:
    outputting the given day associated with the fit score as the start day for the transplantation schedule for the given crop.

15. A computer program product, the computer program product comprising a computer readable storage medium having program instructions embodied therewith, the program instructions executable by a computing device to cause the computing device to:
    determine one or more lifecycle constraints associated with a given crop by analyzing crop data;
    determine one or more cultivation conditions constraints associated with cultivating the given crop by analyzing cultivation conditions data;
    determine one or more weather forecast constraints associated with a given geographic area by analyzing weather forecast data;
    generate a transplantation schedule for increasing yield of the given crop in the given geographic area based on determining a fit across (i) the one or more lifecycle constraints, (ii) the one or more cultivation conditions constraints, and (iii) the one or more weather forecast constraints; and
    transplant at least a portion of the given crop within the given geographic area in accordance with the transplantation schedule.

16. A system comprising:
    a memory; and
    at least one processor coupled to the memory and configured for:
        determining one or more lifecycle constraints associated with a given crop by analyzing crop data;
        determining one or more cultivation conditions constraints associated with cultivating the given crop by analyzing cultivation conditions data;
        determining one or more weather forecast constraints associated with a given geographic area by analyzing weather forecast data;

generating a transplantation schedule for increasing yield of the given crop in the given geographic area based on determining a fit across (i) the one or more lifecycle constraints, (ii) the one or more cultivation conditions constraints, and (iii) the one or more weather forecast constraints; and transplanting at least a portion of the given crop within the given geographic area in accordance with the transplantation schedule.

17. A method, comprising:

determining one or more lifecycle constraints associated with each of multiple crops of a pre-determined set of crops by analyzing crop data via a crop data module executing on a computing device;

determining one or more cultivation conditions constraints associated with each of the multiple crops of the pre-determined set of crops by analyzing cultivation conditions data via a conditions data module executing on the computing device;

determining one or more weather forecast constraints associated with a given geographic area by analyzing weather forecast data via a weather forecast data module executing on the computing device;

generating a transplantation schedule for increasing yield of each of the multiple crops of the pre-determined set of crops in the given geographic area based on determining a fit across (i) the one or more lifecycle constraints associated with each of the multiple crops, (ii) the one or more cultivation conditions constraints associated with each of the multiple crops, and (iii) the one or more weather forecast constraints, wherein said transplantation schedule comprises an ordering of the multiple crops for transplantation, and wherein said generating is executed by a crop transplantation scheduler module of the computing device; and transplanting at least a portion of the multiple crops within the given geographic area in accordance with the transplantation schedule.

18. The method of claim 17, wherein said one or more cultivation conditions constraints comprises a range of time required for fallowing between successive transplantations in the given geographic area.

19. The method of claim 17, wherein said generating the transplantation schedule for each of the multiple crops comprises:

computing, for each specified potential start day for a first crop of the multiple crops, a fit score for each constraint across (i) the one or more lifecycle constraints, (ii) the one or more cultivation conditions constraints, and (iii) the one or more weather forecast constraints; and aggregating a weighted fit score across all constraints to determine a fit score for each specified potential start day for a first crop to determine a start day for the first crop.

20. The method of claim 19, comprising:

computing, for a second crop of the multiple crops, and for each specified fallow time period subsequent to the start day for the first crop, a fit score for each constraint across (i) the one or more lifecycle constraints, (ii) the one or more cultivation conditions constraints, and (iii) the one or more weather forecast constraints; and aggregating a weighted fit score across all constraints to determine a fit score for each specified time period subsequent to the start day of the first crop to determine a start day for the second crop.

* * * * *